No. 892,073. PATENTED JUNE 30, 1908.
E. T. McKAIG.
POWER TRANSMITTER.
APPLICATION FILED OCT. 9, 1907.

2 SHEETS—SHEET 1.

Witnesses:
Inventor:
E. T. McKaig,
by Bacon & Hopkins
Attys

No. 892,073. PATENTED JUNE 30, 1908.
E. T. McKAIG.
POWER TRANSMITTER.
APPLICATION FILED OCT. 9, 1907.

2 SHEETS—SHEET 2.

Witnesses
Inventor
E. T. McKaig

UNITED STATES PATENT OFFICE.

EDDY T. McKAIG, OF CHICAGO, ILLINOIS.

POWER-TRANSMITTER.

No. 892,073.  Specification of Letters Patent.  Patented June 30, 1908.

Application filed October 9, 1907. Serial No. 396,554.

*To all whom it may concern:*

Be it known that I, EDDY T. McKAIG, a citizen of the United States, residing at Chicago, in the county of Cook and State of Illinois, have invented certain new and useful Improvements in Power-Transmitters, of which the following is a full, clear, and exact specification.

This invention relates to power transmitters for general purposes but more particularly to the type commonly known as transmission gears for motor vehicles and it has for its primary object to provide an improved, simple and efficient form of power transmitter embodying durable and readily operative speed changing means.

A further object of the invention is to provide an improved and simple form of power transmitter especially adapted for driving two wheels or shafts separately so that when the device is used on motor vehicles the driving wheels will be capable of independent speeds without the necessity of employing differential gears.

With a view to the attainment of these ends and the accomplishment of certain other objects, which will hereinafter appear, the invention consists in certain features of novelty in the construction, combination and arrangement of parts which will now be described with reference to the accompanying drawings and more particularly pointed out in the claims.

Figure 1:
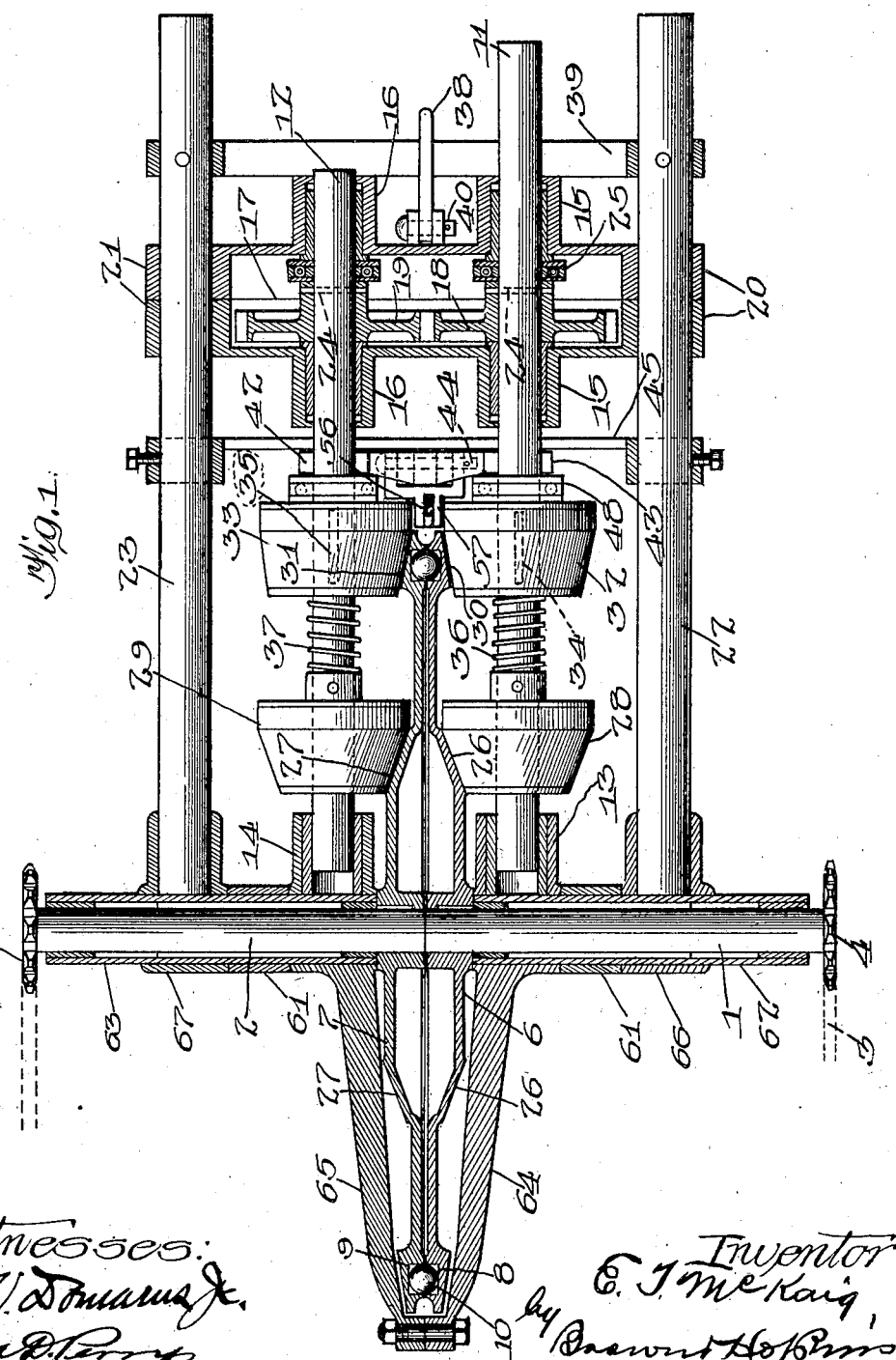
Figure 2:
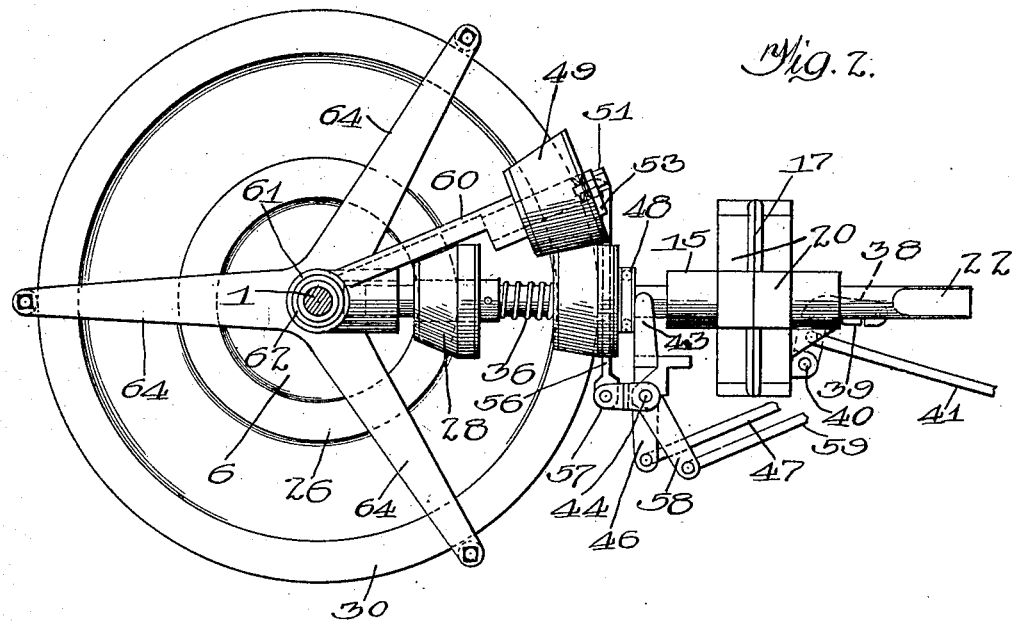
Figure 3:
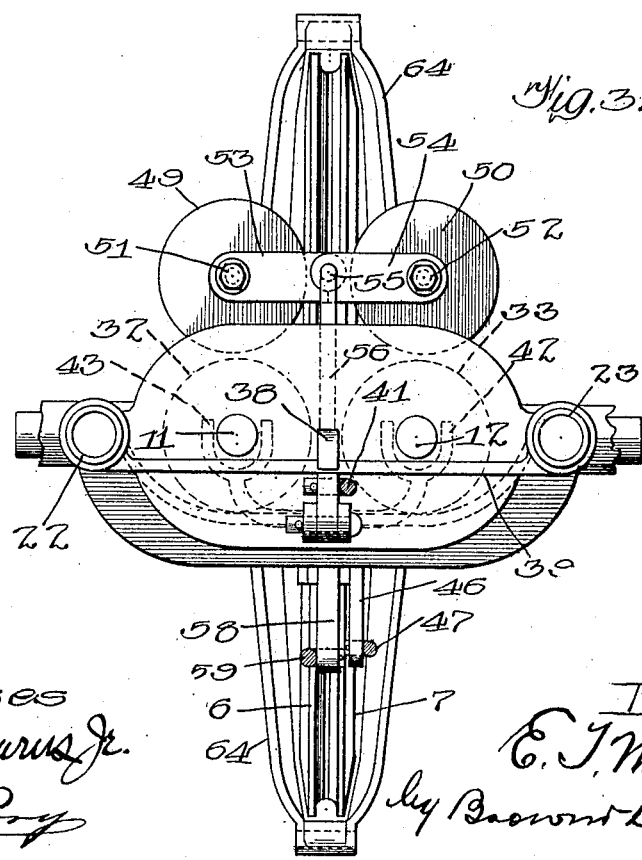

In the said drawings, Figure 1 is a plan section of a power transmitter embodying this invention, the plane of the section passing through the centers of the driving and driven shafts. Fig. 2 is a side elevation thereof, and Fig. 3 is a front elevation.

If the invention is to be employed in the propulsion of motor vehicles or the like, the driving wheels of the vehicle, not shown, should be connected to two separate shafts 1, 2, in any suitable way, as by means of chains 3 and sprockets 4, 5. These shafts 1, 2, are the driven shafts and are journaled in line with each other and they are provided respectively with wheels 6, 7, at their inner ends, the wheels being keyed or otherwise rigidly secured to the shafts 1 and 2 so as to compel the shafts to rotate therewith, and the opposed faces of the wheels, which are brought as close together as feasible without being in actual contact, are provided with ball races 8, 9, in which are housed anti-friction rollers or balls 10, which provide the wheels 6, 7, with mutual support one against the other and at the same time relieve the friction that would otherwise be due to the wheels being directly compressed together. Arranged in planes parallel with the planes of the wheels 6, 7, are two shafts 11, 12, the shaft 11 being, if desired, the engine shaft. These are driving shafts and at one end are slidably mounted in bearings 13, 14, respectively while at the other end they are journaled in a sliding gear case having bearings 15, 16, which respectively receive and support the shafts at that end. This gear case, if desired, may be divided in a plane perpendicular to that in which the shafts 11, 12, lie, on a line 17, so that a pair of gear wheels 18, 19, which connect the shafts 11, 12 together may be readily inserted and completely housed.

The sections of the gear case are provided with supporting lugs 20, 21, which are slidably mounted upon parallel bars 22, 23, respectively and the gear case is connected in some suitable way with the shafts 11, 12 so that as the gear case slides on the guide bars 22, 23, shafts 11, 12 will be caused to make a corresponding longitudinal movement. To that end the gears 18, 19 are secured to the shafts 11, 12 by pins 24, the gears on one side taking their abutment directly against the side wall of the gear case or upon the ordinary bushing employed, the gear wheel at the other side bearing against any suitable anti-friction washer or end-thrust bearing 25 to relieve the friction that would be induced otherwise by the gear case bearing directly against the hub of the gear when moving towards the left. The wheels 6, 7, are provided with beveled faces 26, 27, respectively which in effect constitute beveled pulleys or friction surfaces adapted to be engaged respectively by beveled pulleys 28, 29, secured rigidly to the shafts 11, 12 respectively when the shafts are thrust in the direction of these surfaces 26, 27, the pulleys 28, 29 being of course of the same diameter, but considerably less in diameter than the diameter of the pulleys 26, 27. It will thus be seen that when the gear case supporting the forward ends of the shafts 11, 12 is moved to the left, the pulleys 26, 27, will be rotated in the same direction by the frictional contact of the pulleys 28, 29, and the shafts 1, 2, will be accordingly driven, but should the vehicle be turning a corner at that time, thereby causing one of the sprockets 4, 5, to rotate faster than the other, the contacting surfaces of the pulleys would slip sufficiently to allow this differential movement of the sprockets without damage to the parts.

The pulley wheels 6, 7, at or near their outer edges are provided with additional beveled faces 30, 31, and arranged to engage with these faces respectively are cone pulleys 32, 33, which are slidably secured to the shafts 11, 12, by means of splines or slip keys 34, 35. Arranged between the pulleys 28, 29 and the pulleys 32, 33, respectively are springs 36, 37 or other suitable means for holding the pulleys 32, 33 out of contact with their pulley faces 30, 31, while the pulleys 28, 29 are in engagement with their respective pulley faces 26, 27. When it is desired to force the pulleys 32, 33 into engagement with pulley faces 30, 31, for driving the shafts 1, 2, at a low speed, the gear case is locked against sliding movement on the guide bars 22, 23, by any suitable means to prevent the shafts 11, 12 from sliding when pressure is applied to the pulleys 32, 33 for overcoming the resistance of the springs 36, 37. Such locking means may consist of a hook or latch 38 arranged to engage a cross bar 39 secured to the guide rods 22, 23, the latch 38 being pivoted at 40 to the gear case and provided with an operating rod or other suitable connection 41 and adapted to release the latch and slide the gear case, forcing the pulleys 28, 29 into engagement by one and the same movement. The pulleys 32, 33 are operated as described to engage their pulley faces 30, 31, when the latch 38 is locked to the cross bar 39, by any suitable shifter, such as the pair of forks 42, 43, pivoted at 44 to a cross bar 45 rigidly secured to the guide bars 22, 23, the forks 42, 43 having an arm 46 whereby they may be operated from a distance, if desired, by a rod 47. 48 represent anti-friction bearings interposed between the pulleys 32, 33 and the forks 42, 43 for relieving these parts of the wear that might be occasioned by the pressure of the forks against the pulleys. When the forks 42, 43 are not under stress the pulleys 32, 33 are moved away from their pulley faces 30, 31, by the springs 36, 37 which, of course, have no effect upon the pulleys 28, 29, but these are moved out of contact with their pulley faces 26, 27, by the rod 41, the parts being so constructed and arranged that when the rod 41 is pushed in one direction it will lift the latch 38 and at the same time slide the shafts 11, 12, but in doing this the end of the latch need not be carried out of contact with the top of the bar 39. Consequently when the rod 41 is given a reverse pull the latch will slide over the bar 39 while the pulleys 28, 29 are being withdrawn from engagement with faces 26, 27.

In order that the motion of the shafts 1, 2, may be reversed from the direction of rotation given them by the means described, a third pair of small cone pulleys 49, 50 are employed and arranged over one of the other pairs of cone pulleys, preferably over the low speed pulleys 32, 33. These additional pulleys are beveled to match both the pulleys 32 and 33 and the pulley faces 30, 31 at one and the same time and are so mounted that when they are pulled downwardly into engagement with the pulleys 32, 33, they will also press into firm engagement with the pulley faces 30, 31 and thereby impart to the pulley wheels 6, 7, respectively the rotary motion of the pulleys 32, 33, respectively but in a direction which is the reverse of that imparted to the wheels 6, 7, by the pulleys 32, 33. Any suitable devices may be employed for giving to the pulleys 49, 50, this character of support and operation. The pulleys 49, 50 are shown as mounted upon axles 51, 52 which are pivotally tied together by the members 53, 54 of a rule joint whose pivot 55 is connected by a downwardly extending rod or link 56 to one arm 57 of a bell crank which is pivoted on the pivot 44 to the cross bar 45, and whose other arm 58 may be connected to an operating rod 59 so as to be capable of operating the pulleys 49, 50 from a distance. Hence it will be seen that when the pivot 55 of the rule joint is pulled downwardly the pulleys 49, 50 will be lowered into engagement with the pulleys 32, 33, and also pressed into firm engagement with the pulley faces 30, 31; when the link 56 is elevated the rule joint members 53 and 54 will be straightened out and lift the pulleys 49, 50 to their former disengaged positions. The shafts 51, 52 of the pulleys 49, 50 may be thus supported in any suitable way, as by laterally deflectable arms 60 pivotally connected by collars 61 to the sleeves or housings 62, 63 in which the shafts 1, 2 are journaled. These housings or sleeves 62, 63 are sustained in alinement by connected yokes 64, 65 which also serve as the support for the bearings 13, 14. The guide bars 22, 23 may also be supported at one end by collars 66, 67 upon these housings 62, 63 respectively.

In order that my invention may be understood by those skilled in the art, the details of an exemplification thereof have been thus specifically described, but

What I claim as new and desire to secure by Letters Patent, is—

1. In a power transmitter, the combination of two independent driven shafts, pulleys secured to said shafts and having beveled friction surfaces, end thrust bearings interposed between said pulleys for resisting their movement towards one another, two driving shafts arranged at an angle to said driven shafts, beveled pulleys on said driving shafts arranged to engage the beveled faces of the first said pulleys respectively on their outer sides so as to force the first said pulleys towards one another, and means for moving the second said pulleys into and out of engagement with the first said pulleys at will.

2. In a power transmitter, the combination of two independent driven shafts, pulleys secured on said shafts and having beveled friction surfaces, two driving shafts arranged at an angle to said driven shafts said driving shafts being movable longitudinally and rigidly fixed against lateral movement, and pulleys secured on said driving shafts in position to engage the first said pulleys respectively when the driving shafts are moved towards the driven shafts.

3. In a power transmitter, the combination of two independent driven shafts arranged lengthwise of each other, pulleys on said shafts each having two concentric friction surfaces, driving shafts arranged at an angle to said driven shafts, two pulleys on each of said driving shafts engaging the friction surfaces on the first said pulleys respectively, and means whereby the pulleys on each driving shaft may be shifted into and out of engagement with their respective pulleys on the driven shafts at will.

4. In a power transmitter, the combination of two driven shafts arranged end to end, pulleys on said shafts having concentric friction surfaces, two driving shafts arranged at an angle to said driven shafts, two pulleys movable independently of each other on each of said driving shafts and adapted to engage the friction surfaces on the first said pulleys respectively, means whereby the driving shafts may be moved longitudinally for throwing one pulley on each into and out of engagement with its companion friction surface of the pulley on the driven shaft, and means whereby the other pulley on each driving shaft may be shifted longitudinally of the driving shaft independently thereof.

5. In a power transmitter, the combination of two driven shafts, pulleys secured to said shafts, driving shafts arranged at an angle to said driven shafts, gearing connecting said driving shafts together, a casing inclosing said gearing and movable towards and from said driven shafts, means for causing said driving shafts to move with said casing, and pulleys on said driving shafts engaging the first said pulleys respectively.

6. In a power transmitter, the combination of two driven shafts, pulleys secured to said shafts, two driving shafts arranged at an angle to said driven shafts, gearing connecting said driving shafts together, a casing inclosing said gearing, a frame or way on which said casing is movable towards and from said driven shafts, means for causing said driving shafts to move with said casing longitudinally, and pulleys on said driving shafts engaging the first said pulleys respectively.

7. In a power transmitter, the combination of two driven shafts, pulleys secured to said shafts, two driving shafts arranged at an angle to said driven shafts, gearing connecting said driving shafts together, a casing inclosing said gearing and movable towards and from said driven shafts, pulleys on said driving shafts engaging the pulleys on the driven shafts respectively, means for causing said driving shafts to move longitudinally with said casing, and a detachable lock or latch for holding said casing against movement.

8. In a power transmitter, the combination of two driven shafts, pulleys secured to said shafts, two driving shafts arranged at an angle to said driven shafts, gearing connecting said driving shafts together, a casing inclosing said gearing and movable towards and from said driven shafts, means for causing the driving shafts to move longitudinally with said casing, a lock for securing said casing against movement, and manually operative means connected with said lock for simultaneously releasing it and moving said casing.

9. In a power transmitter, the combination of two driven shafts, pulleys secured to said shafts and having beveled friction faces, two driving shafts, pulleys on said driving shafts arranged to engage said friction faces respectively, and idle pulleys arranged to be forced into engagement with the second said pulleys respectively and also with the beveled friction faces of the first said pulleys.

10. In a power transmitter, the combination of two driven shafts, two driven pulleys on said shafts having beveled friction faces, two driving pulleys having beveled faces engaging the first said faces respectively, idle pulleys arranged opposite the outer faces of the first said pulleys respectively and adapted to engage therewith and also with the second said pulleys respectively, a toggle connecting the said idle pulleys together, and means connected with said toggle near the intermediate joint thereof for pulling the idle pulleys into engagement with the second said pulleys respectively and also into engagement with the outer faces of the first said pulleys.

11. In a power transmitter, the combination of two driven shafts, driven pulleys thereon having concentric beveled friction faces, two driving shafts arranged at an angle to the driven shafts and movable longitudinally, means for locking said driving shafts against longitudinal movement at will, beveled driving pulleys on said driving shafts engaging respectively with one set of the friction faces on said driven pulleys, a second pair of driving pulleys on the driving shafts movable longitudinally independently thereof for engaging the other set of friction faces on the driven pulleys, and means for moving the second pair of driving pulleys lengthwise of the driving shafts after the driving shafts have been locked against longitudinal movement.

In testimony whereof I have signed my name to this specification, in the presence of two subscribing witnesses, on this 5th day of October A. D. 1907.

EDDY T. McKAIG.

Witnesses:
FRANCIS A. HOPKINS,
M. W. CANTWELL.